United States Patent
Alghanmi et al.

(10) Patent No.: US 12,409,958 B2
(45) Date of Patent: Sep. 9, 2025

(54) ADVANCED DRONE PORT STATION FOR ENHANCED MAINTENANCE, MONITORING, AND SURVEILLANCE OPERATIONS

(71) Applicants: SAUDI ARABIAN OIL COMPANY, Dhahran (SA); KING FAHD UNIVERSITY OF PETROLEUM & MINERALS, Dhahran (SA)

(72) Inventors: Abdulmalik Abdullah Alghanmi, Al Ghazawat (SA); Abdulaziz S. Al-Qasim, Dammam (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 108 days.

(21) Appl. No.: 18/159,944

(22) Filed: Jan. 26, 2023

(65) Prior Publication Data

US 2024/0253830 A1    Aug. 1, 2024

(51) Int. Cl.
    *B64U 80/25*    (2023.01)
    *B64F 1/36*     (2024.01)
    (Continued)

(52) U.S. Cl.
    CPC .............. *B64U 80/25* (2023.01); *B64F 1/36* (2013.01); *B64U 70/95* (2023.01); *B64U 70/99* (2023.01); *B64U 2201/10* (2023.01)

(58) Field of Classification Search
    CPC ........ B64U 70/95; B64U 70/99; B64U 80/25; B64U 50/37
    See application file for complete search history.

(56) References Cited

U.S. PATENT DOCUMENTS

| | | |
|---|---|---|
| 6,620,482 B2 * | 9/2003 | Carr .................. A01M 29/32 428/17 |
| 9,387,928 B1 | 7/2016 | Gentry et al. |
| | (Continued) | |

FOREIGN PATENT DOCUMENTS

| | | |
|---|---|---|
| AU | 2021200446 A1 | 2/2021 |
| JP | 2019089461 A | 6/2019 |
| | (Continued) | |

OTHER PUBLICATIONS

A. M. Jawad et al.; "Wireless Power Transfer With Magnetic Resonator Coupling and Sleep/Active Strategy for a Drone Charging Station in Smart Agriculture", IEEE Access; vol. 7; Sep. 23, 2019; pp. 139839-139851 (13 pages).

(Continued)

*Primary Examiner* — Richard Green
(74) *Attorney, Agent, or Firm* — Osha Bergman Watanabe & Burton LLP (57) ABSTRACT

A drone system includes a headquarter station and one or more drone port stations. Each drone port station includes a platform configured to receive a drone, a radar system configured to detect and identify the drone, and one or more locker clips disposed on the platform, wherein the one or more locker clips are configured to lock onto one or more legs extending from the drone. Each drone port station also includes an internal computer configured to control operations of the drone port station, an internal camera operatively connected to the internal computer, where the internal camera is configured to detect a charging port or a fuel tank of the drone, a glass panel placed on the platform, where the glass panel is configured to protect the internal camera, and an antenna extending from the platform and configured to provide a communications pathway from the drone port station to the headquarter station.

12 Claims, 7 Drawing Sheets

(51) Int. Cl.
*B64U 70/95* (2023.01)
*B64U 70/99* (2023.01)

(56) References Cited

U.S. PATENT DOCUMENTS

| | | | | |
|---|---|---|---|---|
| 9,937,808 | B2* | 4/2018 | Evans | B64U 10/10 |
| 10,457,420 | B2* | 10/2019 | Heinonen | B64U 80/25 |
| 10,488,512 | B1* | 11/2019 | Pounds | B64U 70/95 |
| 11,431,168 | B2* | 8/2022 | Syracuse | B64U 50/37 |
| 11,854,416 | B2* | 12/2023 | Prieto | B64U 80/25 |
| 11,977,395 | B2* | 5/2024 | Anderson | B64U 70/95 |
| 2016/0286135 | A1* | 9/2016 | Baseuny | H04B 1/3888 |
| 2020/0290752 | A1* | 9/2020 | Kolosiuk | B64U 80/25 |
| 2020/0349852 | A1 | 11/2020 | DiCosola | |
| 2021/0031947 | A1 | 2/2021 | Wankewycz et al. | |
| 2021/0086913 | A1* | 3/2021 | Friedman | B64U 70/90 |
| 2022/0019243 | A1 | 1/2022 | Villiers | |
| 2023/0167653 | A1* | 6/2023 | Waters | B64U 80/25 |
| | | | | 244/114 R |

FOREIGN PATENT DOCUMENTS

| | | | |
|---|---|---|---|
| JP | 2021109574 A | 8/2021 | |
| KR | 20190097679 A * | 8/2019 | ............ H02S 40/10 |
| KR | 20200013352 A | 2/2020 | |
| WO | 2016/205415 A1 | 12/2016 | |
| WO | 2021/173737 A1 | 9/2021 | |

OTHER PUBLICATIONS

International Search Report issued for corresponding international patent application No. PCT/US2024/012809, mailed May 13, 2024 (6 pages).
Written Opinion issued for corresponding international patent application No. PCT/US2024/012809, mailed May 13, 2024 (10 pages).
Kazem, Hussein A., et al., "A review of dust accumulation and cleaning methods for solar photovoltaic systems," Journal of Cleaner Production, 2020 (24 pages).

* cited by examiner

ADVANCED DRONE PORT STATION FOR ENHANCED MAINTENANCE, MONITORING, AND SURVEILLANCE OPERATIONS

BACKGROUND

Drones are commonly used to automate tasks related to transposition, delivery, maintenance, monitoring, and surveillance. Drones may be pre-programmed or controlled autonomously from a centralized headquarter (HQ) station. In many situations, drones are powered by an on-board battery. Such drones are typically suited to environments which are relatively compact, such as a city or other urban populated area.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a drone system which may include a headquarter station and one or more drone port stations. Each drone port station may include a platform configured to receive a drone, a radar system configured to detect and identify the drone, and one or more locker clips disposed on the platform, wherein the one or more locker clips are configured to lock onto one or more legs extending from the drone. Each drone port station may also include an internal computer configured to control operations of the drone port station, an internal camera operatively connected to the internal computer, where the internal camera is configured to detect a charging port or a fuel tank of the drone, a glass panel placed on the platform, where the glass panel is configured to protect the internal camera, and an antenna extending from the platform and configured to provide a communications pathway from the drone port station to the headquarter station.

In another aspect, embodiments disclosed herein relate to a drone port station. The drone port station may include a platform configured to receive a drone, a radar system configured to detect and identify the drone, and one or more locker clips disposed on the platform, wherein the one or more locker clips are configured to lock onto one or more legs extending from the drone. The drone port station may also include an internal computer configured to control operations of the drone port station, an internal camera operatively connected to the internal computer, where the internal camera is configured to detect a charging port or a fuel tank of the drone, and a fueling conduit configured to connect to a fueling port of a drone. The drone port station may further include a glass panel placed on the platform, where the glass panel is configured to protect the internal camera, and an antenna extending from the platform.

In yet another aspect, embodiments disclosed herein relate to a method of charging a drone at a drone port station. The method may include detecting the drone using a radar system disposed on the drone port station, guiding, using the radar system, the drone to a platform of the drone port station, and locking the drone onto the platform using one or more locker clips. The method may also include detecting a fueling port of the drone using an internal camera disposed on the drone port station, and connecting a fueling conduit to the fueling port of the drone, where the fueling port is a charging port or a fuel tank, and where the fueling conduit is a movable charger or a fuel pipe.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to a drone port station located at a remote location and configured to receive and charge a drone. In another aspect, embodiments disclosed herein relate to a drone system, where a drone may travel between a headquarter station and a drone port station. In yet another aspect, embodiments disclosed herein relate to a method of charging a drone at a drone port station.

Figure 1:
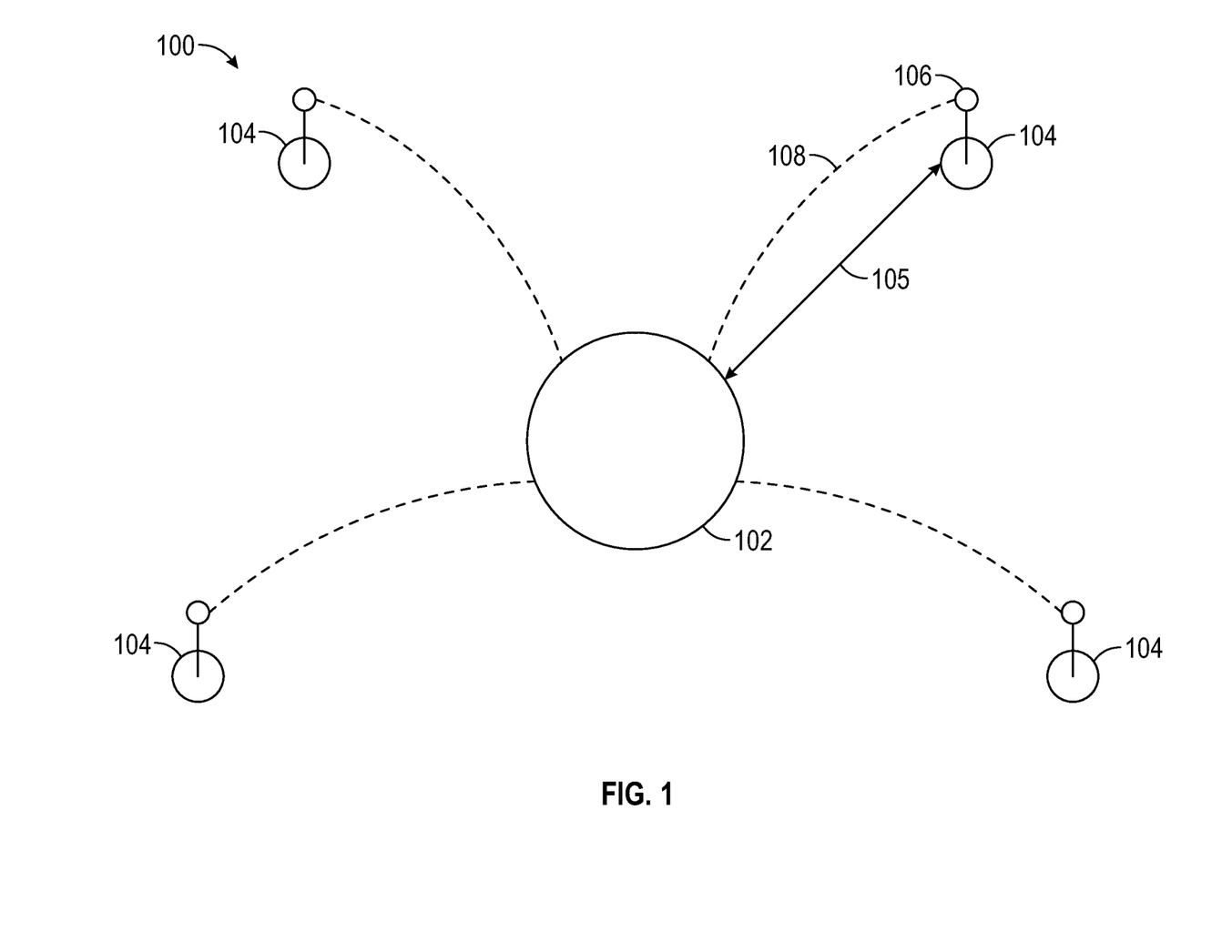
FIG. 1 shows a drone system in accordance with one or more embodiments.

FIG. 1 shows a drone system 100 in accordance with one or more embodiments. The drone system 100 may include a headquarter (HQ) station 102 centrally located at an easily accessible location. For example, the HQ station 102 may be located at an oil and gas processing plant or a drilling site. Alternatively, the HQ station 102 may be located at corporate buildings. The HQ station 102 may be configured to dispatch drones and to monitor the drones during their travelling operations. In one or more embodiments, the HQ station 102 may be configured to fully control drones remotely in situations where manual control is required. The HQ station 102 may be further configured to process images and live videos transmitted by the drones.

The drone system 100 may also include one or more drone port stations 104. Each drone port station 104 may be located at a distance 105 from the HQ station 102. Further, each drone port station 104 may include an antenna 106. A communications pathway 108 may extend from the HQ station 102 to the antenna 106 disposed on each drone port station 104.

The type of drone port station 104 may differ depending on the desired placement location. A remote area station (RAS) drone port station may be installed in extremely remote locations. An electric transmission lined linked station (ETLLS) drone port station may be built on or near electric transmission lines towers. A fuel station (FS) drone port station may be built near gas stations.

In one or more embodiments, a drone may leave the HQ station 102 and may begin its daily duty. A drone's daily duty may be, for example, monitoring a certain sector of pipelines. When the drone's battery depletes below a certain percentage of its full capacity, the drone may search for the closest drone port station 104 and may communicate with the drone port station 104 via the antenna 106. The depletion percentage may be selected based on the implementation of the system, the type of drones used, the capacity of the drone port stations 104, and the distance between adjacent drone port stations 104. For example, in one or more embodiments, the drone may search for the closest drone port station 104 when the drone's battery depletes below 30% of full capacity. In one or more embodiments, the drone port station 104 may transmit information regarding surrounding conditions, such as weather conditions, to the drone so that the drone may determine if it is safe to fly to the drone port station 104. If yes, the drone will fly towards the drone port station 104. In one or more embodiments, the HQ station 102 may be configured to fully control the drone port stations 104 and the drones remotely in situations where manual control is required.

Figure 2A:
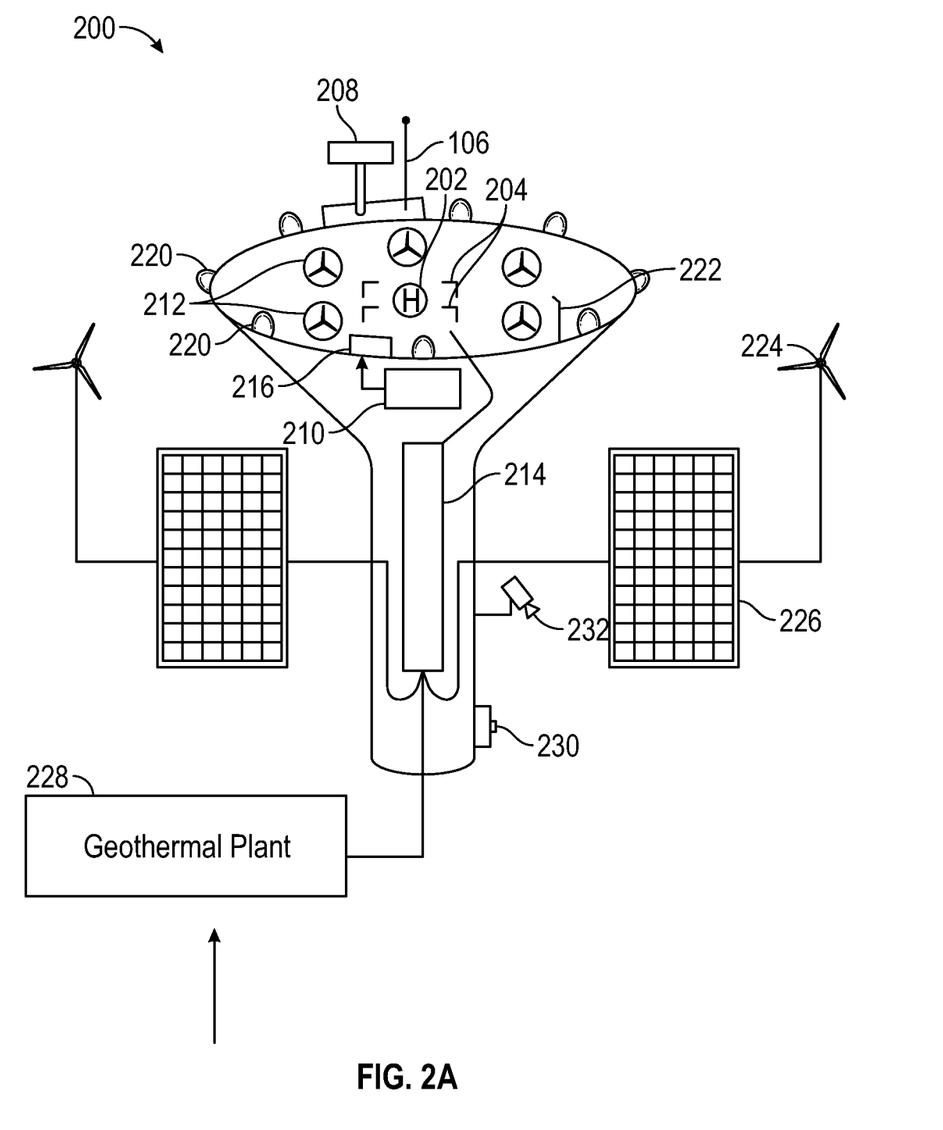
FIGS. 2A-2B show a drone port station in accordance with one or more embodiments.
Figure 2B:
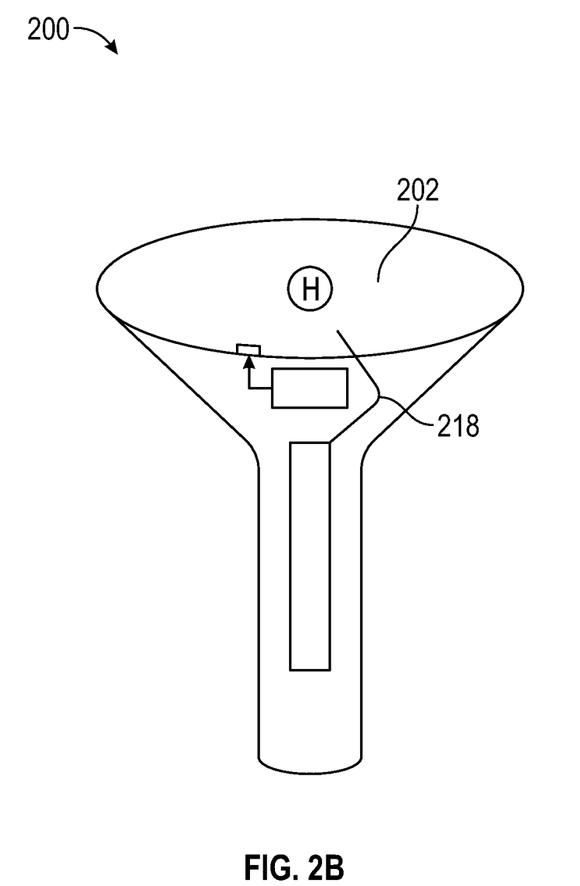

FIGS. 2A-2B show a drone port station in accordance with one or more embodiments. More specifically, FIGS. 2A-2B show a RAS drone port station 200 in accordance with one or more embodiments. The RAS drone port station 200 may include a platform 202 configured to receive a drone. One or more locker clips 204 may be disposed on the platform 202. The one or more locker clips 204 may be used to lock onto one or more legs which may extend from the drone after the drone has landed on the platform 202. The locker clips 204 may prevent the drone from slipping and falling from the platform 202. The locker clips 204 may unlock following completion of the charging procedure, releasing the drone from the platform 202.

A radar system 208 may extend from the platform 202. The radar system 208 may detect and identify the drone. Once the radar system 208 has detected the drone, pertinent information regarding the drone may be transmitted to an internal computer 210 disposed on the RAS drone port station 200. The internal computer 210 may communicate with the HQ stations 102 via an antenna 106 extending from the platform 202. The internal computer 210 may also control operations of the RAS drone port station 200.

In one or more embodiments, one or more small turbines 212 may be installed on the platform 202. When the drone is in the process of landing on the platform 202, the one or more small turbines 212 may capture and utilize the air propelled by the landing of the drone to generate energy, which may be stored in a battery 214.

An internal camera 216 may be operatively connected to the internal computer 210. A glass panel may be placed on the platform 202 to protect the internal camera 216. In one or more embodiments, the internal camera 216 may detect the drone's charging port. Once the charging port has been detected, a fueling conduit, such as the movable charger 218 shown in FIG. 2B, may connect itself to the charging port. Once the drone is fully charged, the movable charger 218 may disconnect itself and the locker clips 204 may unlock, allowing the drone to disengage from the platform 202.

Referring back to FIG. 2A, the RAS drone port station 200 may also include a number of ancillary systems. For example, in some embodiments, the RAS drone port station 200 may include a safety lights system 220. In other embodiments, the RAS drone port station 200 may include a bird repellant system 222.

The RAS drone port station 200 may be powered by multiple renewable energy sources. The small turbines 212 and one or more main turbines 224 may generate kinetic energy from wind produced by the landing and the taking off of the drone from the platform 202. One or more solar panels 226 may be installed on the RAS drone port station 200 and may generate solar energy. In one or more embodiments, the solar panels 226 may be fixed, floating, or solar tracker panels. Further, in other embodiments, the solar panels 226 may be self-cleaning solar panels. The RAS drone port station 200 may also be connected to a geothermal plant 228, such that geothermal energy generated in the geothermal plant 228 may be transmitted to the RAS drone port station 200.

Since the RAS drone port station 200 may be located in remote areas, such as a desert, for example, an emergency button 230 may be installed on the RAS drone port station 200. The emergency button 230 may be pressed by a person or operator who has become lost. Pushing the emergency button 230 may create an emergency report, which can be transmitted to the HQ station 102 to alert staff. Staff at the HQ station 102 may then verify the validity of the emergency report using an external camera 232 installed on the RAS drone port station 200. In one or more embodiments, verifying the validity of the emergency report may include using the external camera 232 to photograph and identify the lost person.

Figure 3:
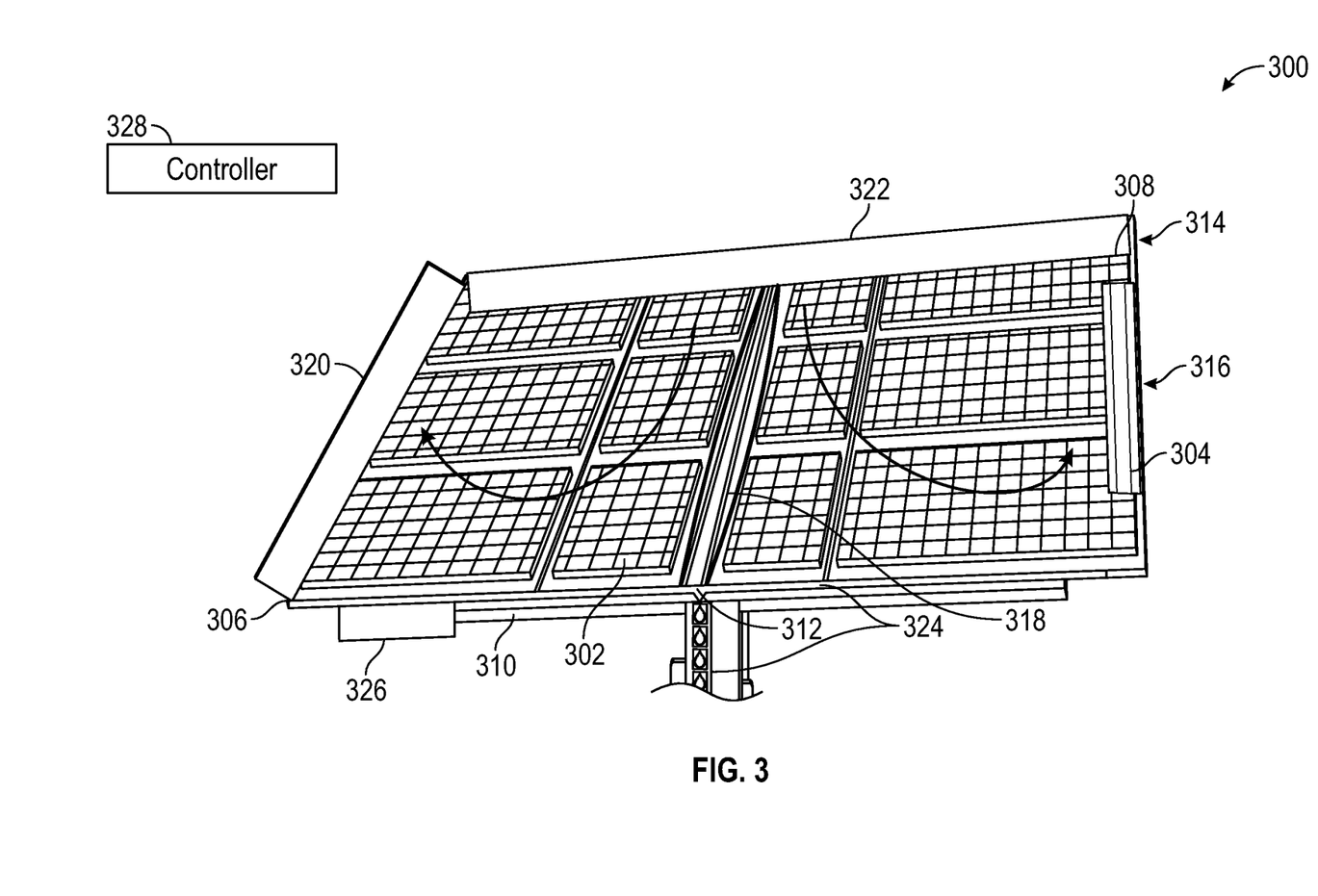
FIG. 3 shows a self-cleaning solar panel in accordance with one or more embodiments.

Turning now to FIG. 3, FIG. 3 shows a self-cleaning solar panel 300 in accordance with one or more embodiments. The solar panels 226, according to one or more embodiments, may be self-cleaning solar panels 300. The self-cleaning solar panel 300 may include a surface 302, where the surface 302 has a first edge 304 and a second edge 306, where a top edge 308 and a bottom edge 310 extend between the first edge 304 and the second edge 306. A center 312 may be located equidistant between the first edge 304 and the second edge 306.

The self-cleaning solar panel 300 may include a mist generator 314 installed along the top edge 308. The mist generator 314 may collect fluid from the air (i.e., during humid periods) into a mini water tank which may be installed on a rear side of the surface 302. The mist generator 314 may be configured to dispense a mist of fluid droplets, such that they may flow from the top edge 308 to the bottom edge 310. In one or more embodiments, the mist generator 314 may be configured to clean dust from the surface 302.

In one or more embodiments, a steam generator 316 may be installed along a first edge 304 of the surface 302. In other embodiments, the steam generator 316 may be installed along the second edge 306, the top edge 308, or the bottom edge 310. The steam generator 316 may be configured to remove sticky substances from the surface 302.

Two micro wiper blades 318 are installed in the center 312 of the surface 302, such that each micro wiper blade 318 may clean half of the surface 302. Specifically, each of the micro wiper blade 318 may move from the center 312 of the surface 302 to the first edge 304 and the second edge 306 in a first direction and a second direction, respectively. The first direction and the second direction may be opposite to one another. Use of the two micro wiper blades 318 may allow for cleaning of the surface 302 of the self-cleaning solar panel 300, increasing its efficiency.

An air blower 320 may installed along the first edge 304, the second edge 306, the top edge 308, or the bottom edge 310. The air blower 320 may be configured to blow dust off the surface 302. A micro-tank 322 may be installed along the rear side of the surface 302 and may contain a volume of washing chemicals. Washing chemicals may be dispensed from the micro-tank 322 onto the surface 302, such that a combination of the washing chemicals, the fluid droplets dispensed by the mist generator 314, and the micro wiper blades 318 may clean the surface 302. In one or more embodiments, the washing chemicals may be soap or other detergents. A drain system 324 may be disposed along the bottom edge 310 to collect and remove any excess fluids from the surface 302.

One or more sensors 326 may be installed on the surface 302. The sensors 326 may be configured to provide an alert of a need for cleaning and to provide a solar panel efficiency percentage. A cut off may be applied by an operator to trigger a time and method for cleaning. In one or more embodiments, the self-cleaning solar panel 300 may be triggered via a controller 328. The controller 328 may be, for example, a built-in automated system, a remote-control unit, or a manual trigger.

In one or more embodiments, the RAS drone port station 200 may be located in an area with plenty of sun but extremely low temperatures. In such embodiments, the self-cleaning solar panel 300 may be equipped with a nano-heating system to melt ice which may form on the surface 302. In some embodiments, solar-magnifying tools or other tools may also be used to melt ice build-up on the surface 302. Melting of ice may allow for an increase in solar panel response and efficiency.

Figure 4:
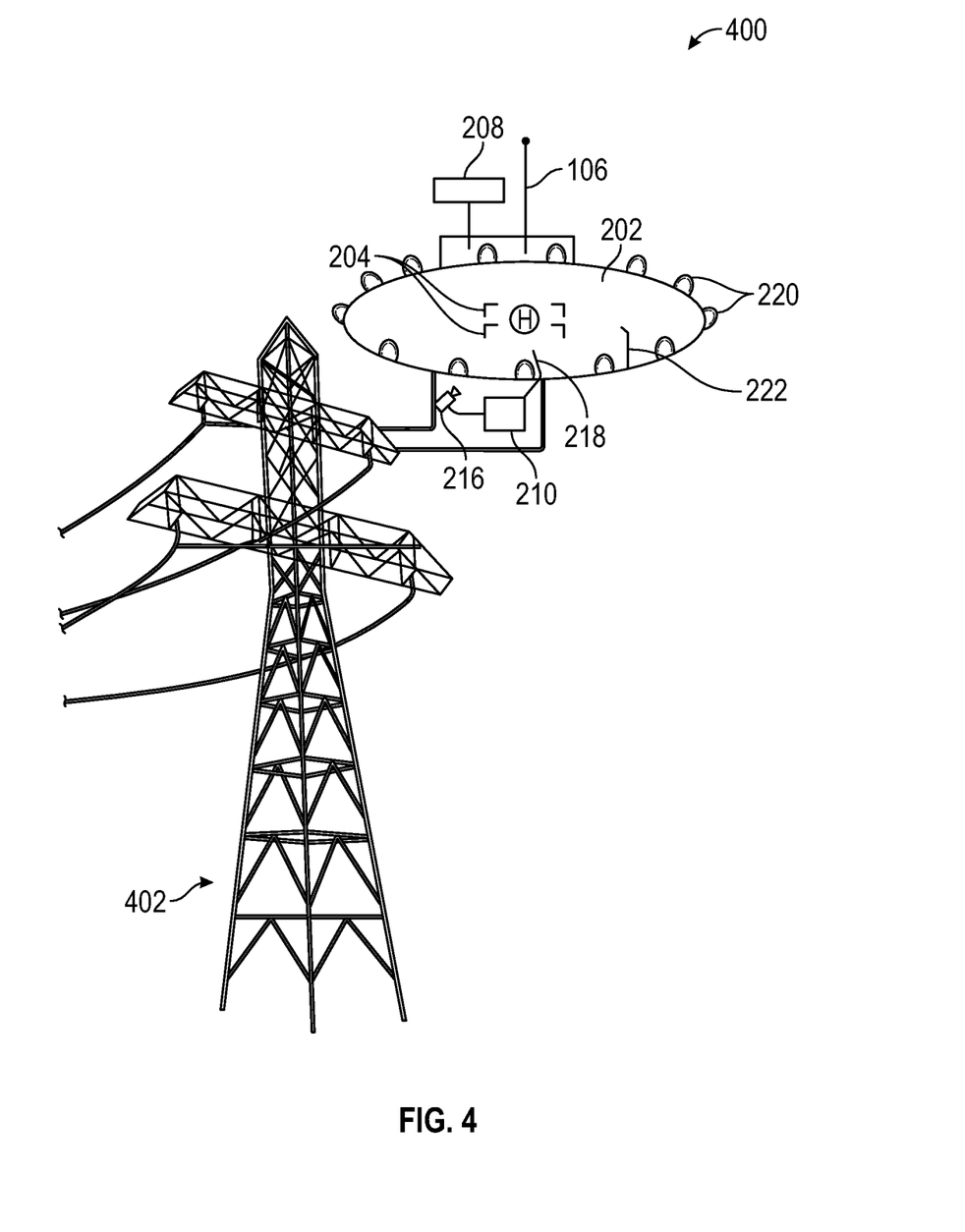
FIG. 4 shows a drone port station in accordance with one or more embodiments.

Turning now to FIG. 4, FIG. 4 shows a drone port station in accordance with one or more embodiments. More specifically, FIG. 4 shows an electric transmission lines linked station (ETLLS) drone port station 400 in accordance with one or more embodiments. ETLLS drone port station 400 may be built on or near one or more electric transmission lines towers 402. The ETLLS drone port station 400 may be powered either from the electric field surrounding the energized wires or from the magnetic field produced by current flowing through the wires.

Similar to the RAS drone port station 200, the ETLLS drone port station 400 may have a platform 202, with an antenna 106 and a radar system 208 extending from the platform 202. Using the radar system 208, the ETLLS drone port station 400 may detect and guide the drone onto the platform 202. Locker clips 204 may secure the drone to the platform 202 and a movable charger 218 may be used to connect to the drone's charging port and perform a charging operation. The internal camera 216 may be used to assist in detection of the drone's charging port. Once the drone is fully charged, the locker clips 204 may be unlocked, and the drone may take off from the platform.

Figure 5:
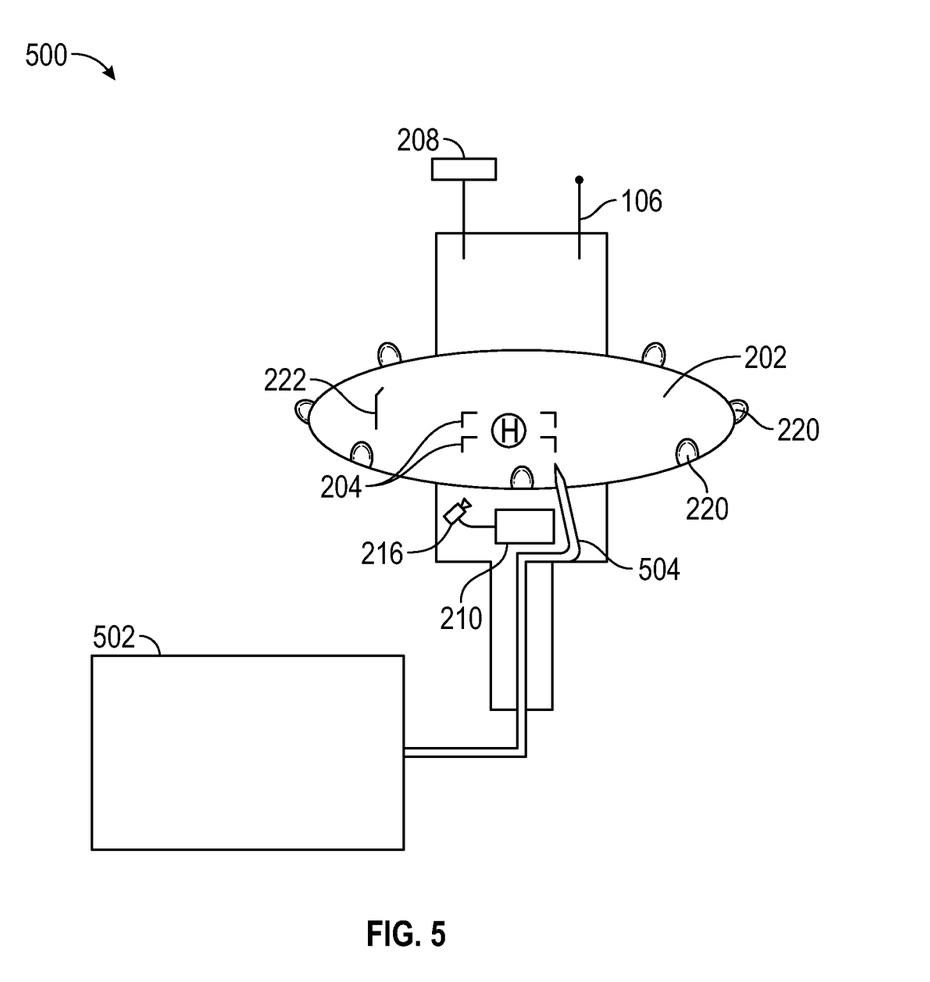
FIG. 5 shows a drone port station in accordance with one or more embodiments.

FIG. 5 shows a drone port station in accordance with one or more embodiments. More specifically, FIG. 5 shows a fuel station (FS) drone port station 500. FS drone port stations 500 may be built near gas stations 502. The FS drone port station 500 may be similar in structure and components to the RAS drone port station 200 and the ETLLS drone port station 400. In one or more embodiments, the fueling conduit installed on the FS drone port station 500 may be a movable fuel pipe 504, which may be configured to connect to a drone's fuel tank.

In one or more embodiments, the drone system 100 may be configured to respond to one or more emergency situations. One possible emergency situation may be a renewable energy source failure on a RAS drone port station 200. In such embodiments, a specialized drone may be deployed from the HQ station 102. The specialized drone may be configured to transport an emergency battery. Once the specialized drone has been dispatched from the HQ station 102, the specialized drone may locate and fly to the nearest ETLLS drone port station 400 or FS drone port station 500. Once at the closest ETLLS drone port station 400 or FS drone port station 500, the specialized drone may collect an emergency battery, which has been fully charged at the station. The specialized drone may then fly to the RAS drone port station 200 which has suffered from an energy failure. The specialized drone may be configured to land on the RAS drone port station 200 and to plug in the emergency battery before returning to the HQ station 102.

Another emergency situation may occur when unstable weather conditions prevent a drone from landing at a desired drone port station 104. In such a situation, the drone may attempt to locate another nearby drone port station 104. If the drone is not able to locate another nearby drone port station 104, the drone may notify the HQ station 102 and may locate the nearest safe area. In one or more embodiments, a safe area may refer to a place of shelter at which the drone may wait out inclement weather conditions. If the drone lands at a safe area, all non-vital systems may be switched off to conserve power.

It may be possible for the drone to sense a danger while sheltering at the safe area. In such cases, the drone may take off and locate another safe area. Otherwise, the drone may wait at the original safe area until the weather conditions improve and it is safe to fly. The drone may then take off and continue on to its originally selected drone port station 104.

Figure 6:
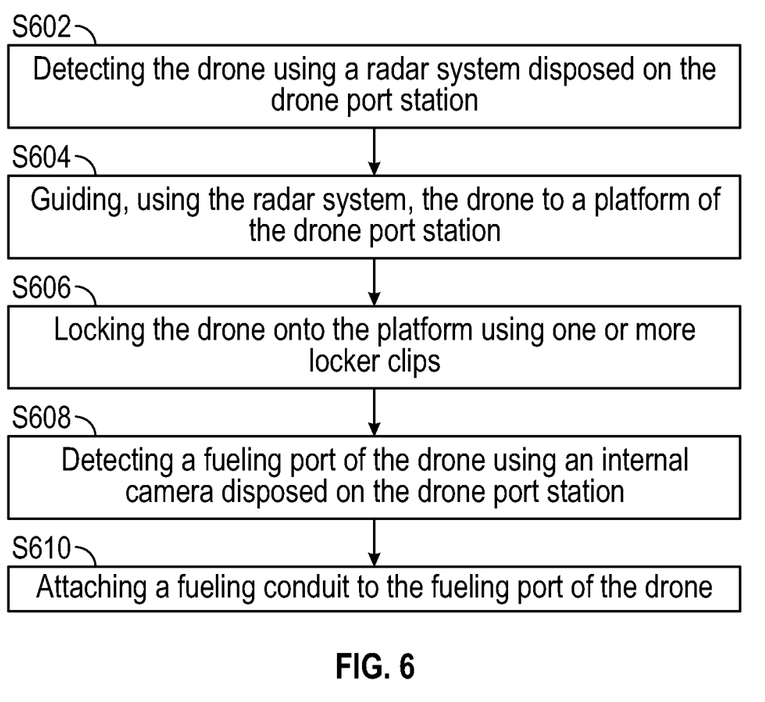
FIG. 6 shows a flowchart of a method in accordance with one or more embodiments.

FIG. 6 depicts a flowchart in accordance with one or more embodiments. More specifically, FIG. 6 depicts a flowchart 600 of a method of charging a drone at a drone port station in accordance with one or more embodiments. Further, one or more blocks in FIG. 6 may be performed by one or more components as described in FIGS. 1-5. While the various blocks in FIG. 6 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, a drone port station 104 may detect a drone using a radar system 208, S602. In one or more embodiments, the radar system 208 may extend from a platform 202 of the drone port station 104. The drone port station 104 may be a RAS drone port station 200, a ETLLS drone port station 400, or a FS drone port station 500.

Using the radar system 208, the drone port station 104 may guide the drone onto the platform 202, S604. The drone may then be locked onto the platform 202 with one or more locker clips 204, S606. The drone's fueling port may be detected using an internal camera 216 disposed on the drone port station 104, S608. In one or more embodiments, the fueling port may be a charging port or a fuel tank. Further, a fueling conduit may be autonomously connected to the fueling port, S610. The fueling conduit may be, for example, a movable charger 218 or a movable fuel pipe 504.

The drone port station 104 may detect when the drone is fully charged and may then disconnect the fueling conduit. The locker clips 204 may be unlocked and the drone may take off from the platform 202.

In one or more embodiments, when the drone port station 104 is a RAS drone port station 200, the fueling conduit may be powered by one or more self-cleaning solar panels 300. Further, an autonomous cleaning operation on the one or more self-cleaning solar panels 300 to remove an accumulation of debris.

Embodiments of the present disclosure may provide at least one of the following advantages. The drone port stations described herein are self-operating stations which can be positioned in populated or remote areas and are designed to charge or fuel drones mid-way through their predetermined flight path. Use of a drone port station therefore allows drones to travel much further than previously allowed without needed to return to the HQ station.

Use of RAS drone port stations allows the stations to be sustainable in remote areas since these stations are fully dependent on renewable energy sources. This maximizes efficiency and reliability of maintenance, transportation, monitoring, and surveillance operations. Additionally, all types of drone port stations form a self-stabilized system in that they are able to support themselves during emergency conditions.

Each type of drone port station is above to identify, communicate with, and guide drones without human intervention. Each drone port station can also communicate with the HQ station to provide periodic status reports or to report any unusual occurrences. Further drone port stations can be equipped with a variety of ancillary systems to further expand functionality. For example, use of an internal camera to detect a charging port or fuel tank of a drone allows for autonomous connection of a fueling conduit to the drone.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A drone port station comprising:
a platform configured to receive a drone;
a radar system configured to detect and identify the drone;
one or more locker clips disposed on the platform, wherein the one or more locker clips are configured to lock onto one or more legs extending from the drone;
an internal computer configured to control operations of the drone port station;
an internal camera operatively connected to the internal computer, wherein the internal camera is configured to detect a charging port or a fuel tank of the drone;
a fueling conduit configured to connect to a fueling port of the drone;
a glass panel placed on the platform, wherein the glass panel is configured to protect the internal camera;
an antenna extending from the platform,
wherein the drone port station is a remote area station (RAS) powered by a renewable energy source; and
a solar panel configured to charge an internal battery, wherein the solar panel comprises:
a mist generator configured to clean dust from a surface of the solar panel by dispensing a mist from a top edge of the solar panel;
a steam generator installed along a first edge of the solar panel, wherein the steam generator is configured to remove one or more sticky substances from the surface;
two micro wiper blades installed in a center of the surface, where a first of the micro wiper blades moves in a first direction, wherein a second of the micro wiper blades moves in a second direction, and wherein the first direction and the second direction are opposite to one another;
an air blower installed along a second edge of the solar panel, wherein the air blower is configured to blow dust off the surface;
one or more sensors configured to provide an alert of a need for cleaning and to provide a solar panel efficiency percentage; and
a micro-tank installed along a rear side of the surface, wherein the micro-tank is filled with a volume of washing chemicals.

2. The drone port station of claim 1, wherein the drone port station is configured to communicate with a headquarter station via the antenna.

3. The drone port station of claim 1 further comprising a bird repellent system comprising a metallic spike integrated into the drone port station.

4. The drone port station of claim 1 further comprising a safety lights system integrated into the drone port station.

5. The drone port station of claim 1 further comprising:
an emergency button configured to create an emergency report and to alert a headquarter station when pressed by an operator; and
an external camera configured to photograph the operator in order to verify a validity of the emergency report.

6. The drone port station of claim 1, wherein the solar panel is triggered by a controller selected from a group consisting of a built-in automated controller, a remote control unit, and a manual trigger.

7. The drone port station of claim 1, wherein the solar panel further comprises a nano-heating system configured to melt ice formed on the surface in a cold environment.

8. A drone system comprising:
a headquarter station; and
one or more drone port stations, each drone port station comprising:
  a platform configured to receive a drone;
  a radar system configured to detect and identify the drone;
  one or more locker clips disposed on the platform, wherein the one or more locker clips are configured to lock onto one or more legs extending from the drone;
  an internal computer configured to control operations of the drone port station;
  an internal camera operatively connected to the internal computer, wherein the internal camera is configured to detect a charging port or a fuel tank of the drone;
  a glass panel placed on the platform, wherein the glass panel is configured to protect the internal camera;
  an antenna extending from the platform and configured to provide a communications pathway from the drone port station to the headquarter station,
  wherein the drone port station is a remote area station (RAS) powered by a renewable energy source; and
  a solar panel configured to charge an internal battery, wherein the solar panel comprises:
    a mist generator configured to clean dust from a surface of the solar panel by dispensing a mist from a top edge of the solar panel;
    a steam generator installed along a first edge of the solar panel, wherein the steam generator is configured to remove one or more sticky substances from the surface;
    two micro wiper blades installed in a center of the surface, where a first of the micro wiper blades moves in a first direction, wherein a second of the micro wiper blades moves in a second direction, and wherein the first direction and the second direction are opposite to one another;
    an air blower installed along a second edge of the solar panel, wherein the air blower is configured to blow dust off the surface;
    one or more sensors configured to provide an alert of a need for cleaning and to provide a solar panel efficiency percentage; and
    a micro-tank installed along a rear side of the surface, wherein the micro-tank is filled with a volume of washing chemicals.

9. The drone system of claim 8, wherein each of the one or more drone port stations further comprises:
an emergency button configured to create an emergency report and to alert a headquarter station when pressed by an operator; and
an external camera configured to photograph the operator in order to verify a validity of the emergency report.

10. The drone system of claim 8, wherein each of the one or more drone port stations further comprises a bird repellent system and a safety lights system integrated into the drone port station, the bird repellent system comprising a metallic spike.

11. A method of charging a drone at a drone port station comprising:
detecting the drone using a radar system disposed on the drone port station;
guiding, using the radar system, the drone to a platform of the drone port station;
locking the drone onto the platform using one or more locker clips;
detecting a fueling port of the drone using an internal camera disposed on the drone port station;
connecting a fueling conduit to the fueling port of the drone,
wherein the fueling port is a charging port or a fuel tank, and
wherein the fueling conduit is a movable charger or a fuel pipe;
providing, via an antenna extending from the platform, a communications pathway from the drone port station to a headquarter station,
wherein the drone port station is a remote area station (RAS) powered by a renewable energy source;
charging an internal battery, via a solar panel disposed on the drone port station;
dispensing a mist from a top edge of the solar panel, via a mist generator, to clean dust from a surface of the solar panel;
removing one or more sticky substances from the surface, via a steam generator installed along a first edge of the solar panel;
installing two micro wiper blades in a center of the surface, wherein a first of the micro wiper blades moves in a first direction, wherein a second of the micro wiper blades moves in a second direction, and wherein the first direction and the second direction are opposite to one another;
blowing dust off the surface, via an air blower installed along a second edge of the solar panel;
alerting a need for cleaning and providing a solar panel efficiency percentage, via one or more sensors; and
filling a micro-tank installed along a rear side of the surface with a volume of washing chemicals.

12. The method of claim 11 further comprising:
detecting the drone is fully charged;
disconnecting the fueling conduit;
unlocking the one or more locker clips; and
releasing the drone from the platform.

* * * * *